(12) United States Patent
Piccard et al.

(10) Patent No.: US 8,115,446 B2
(45) Date of Patent: Feb. 14, 2012

(54) AUTOMOTIVE VEHICLE POWER SYSTEM

(75) Inventors: Douglas Piccard, Ann Arbor, MI (US); Jin Wang, Powell, OH (US); Bruce Carvell Blakemore, Plymouth, MI (US); Steven F. Chorian, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 598 days.

(21) Appl. No.: 12/269,239

(22) Filed: Nov. 12, 2008

(65) Prior Publication Data

US 2010/0117593 A1  May 13, 2010

(51) Int. Cl.
 *H02J 7/14* (2006.01)
 *H02J 7/00* (2006.01)
(52) U.S. Cl. .............. 320/104; 320/128; 307/82
(58) Field of Classification Search .................. 320/104, 320/128
 See application file for complete search history.

(56) References Cited

U.S. PATENT DOCUMENTS

| | | | |
|---|---|---|---|
| 5,283,513 A | 2/1994 | Fujita et al. | |
| 5,869,951 A | 2/1999 | Takahashi | |
| 6,150,795 A | 11/2000 | Kutkut et al. | |
| 6,271,645 B1 | 8/2001 | Schneider et al. | |
| 6,344,985 B1 * | 2/2002 | Akerson | 363/65 |
| 6,583,602 B2 | 6/2003 | Imai et al. | |
| 6,700,349 B2 * | 3/2004 | Emori et al. | 320/104 |
| 6,873,134 B2 | 3/2005 | Canter et al. | |
| 6,882,129 B2 | 4/2005 | Boskovitch et al. | |
| 6,984,961 B2 | 1/2006 | Kadouchi et al. | |
| 7,193,392 B2 | 3/2007 | King et al. | |
| 7,245,108 B2 | 7/2007 | Chertok et al. | |
| 2006/0232238 A1 | 10/2006 | Horii | |
| 2007/0170892 A1 | 7/2007 | Ishii | |
| 2007/0188138 A1 | 8/2007 | Kobayashi | |
| 2009/0086520 A1 * | 4/2009 | Nishimura | 363/133 |

* cited by examiner

*Primary Examiner* — M'Baye Diao
(74) *Attorney, Agent, or Firm* — David B. Kelley; Brooks Kushman P.C.

(57) ABSTRACT

An energy storage system for an automotive vehicle includes a plurality of energy storage units electrically connected in series and a plurality of bi-directional energy converters each having first and second sides. Each of the first sides is electrically connected with one of the plurality of energy storage units. The system also includes another energy storage unit. The second sides of the plurality of bi-directional energy converters are electrically connected in parallel with the another energy storage unit. Each of the bi-directional energy converters is capable of transferring energy between the first and second sides.

20 Claims, 3 Drawing Sheets

AUTOMOTIVE VEHICLE POWER SYSTEM

BACKGROUND

Electrical power systems may be used to electrically power automotive vehicles. Certain techniques for balancing storage cells of electrical power systems are known. As an example, U.S. Pat. No. 6,984,961 to Kadouchi et al. discloses a battery assembly system that includes a plurality of storage batteries connected in series, a voltage detector for detecting voltages generated in the storage batteries and a current detector for detecting a current flowing in the plurality of storage batteries. The battery assembly system also includes a state-of-charge (SoC) calculator for calculating the SoC of the storage batteries based on the detected voltages and current, and a charging/discharging unit for charging or discharging at least one of the plurality of storage batteries so as to equalize the SoC of the storage batteries calculated by the SoC calculator.

As another example, U.S. Pat. No. 6,882,129 to Boskovitch et al. discloses a battery pack for a battery-powered vehicle. The battery pack comprises battery modules coupled in series. The battery modules are configured to provide power to the battery-powered vehicle. Each of the battery modules has a SoC. The battery pack also comprises battery control modules (BCMs) that are coupled to the battery modules. Each of the battery modules is coupled to one of the BCMs and each of the BCMs is configured to monitor a battery module parameter. The battery pack further comprises a battery control interface module (BCIM) coupled to each of the BCMs. The BCIM is configured to receive the battery module parameter from each of the BCMs and independently adjust the SoC of each of the battery modules based on the battery module parameter.

As yet another example, U.S. Pat. No. 6,583,602 to Imai et al. discloses a lower battery block that feeds low-voltage power to a low-voltage load. At least one higher battery block is connected in series with the lower battery block and cooperates with the lower battery block to feed high-voltage power to a high-voltage load. The lower battery block and higher battery block each include cells. A DC/DC converter transmits power from the higher battery block to the lower battery block. A controller detects (i) an electric parameter of the lower battery block that relates to an average per-cell voltage in the lower battery block and (ii) an electric parameter of the higher battery block that relates to an average per-cell voltage in the higher battery block. The controller controls the DC/DC converter in response to the detected electric parameters to equalize the average per-cell voltage in the lower battery block and the average per-cell voltage in the higher battery block.

SUMMARY

An energy storage system for an automotive vehicle includes a plurality of energy storage units electrically connected in series and a plurality of bi-directional energy converters each having first and second sides. Each of the first sides is electrically connected with one of the plurality of energy storage units. The system also includes another energy storage unit. The second sides of the plurality of bi-directional energy converters are electrically connected in parallel with the another energy storage unit. Each of the bi-directional energy converters is capable of transferring energy between the first and second sides.

An automotive vehicle includes an electric machine, a plurality of batteries electrically connected in series and electrically connected with the electric machine, and a plurality of bi-directional DC/DC power converters each having first and second sides. Each of the first sides is electrically connected with one of the plurality of batteries. The vehicle also includes an electrical load and another battery electrically connected with the electrical load. The second sides of the plurality of bi-directional DC/DC power converters are electrically connected in parallel with the another battery. Each of the bi-directional DC/DC power converters is capable of transferring energy between the first and second sides.

An energy storage system for an automotive vehicle includes a battery pack including a plurality of energy storage cells and a plurality of bi-directional DC/DC power converters each having first and second sides and capable of transferring energy between the first and second sides. Each of the first sides is electrically connected with one of the plurality of energy storage cells, and the second sides are electrically connected in parallel. The system also includes a controller configured to balance the battery pack by passing energy between at least two of the plurality of energy storage cells via at least one of the plurality of bi-directional DC/DC power converters.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
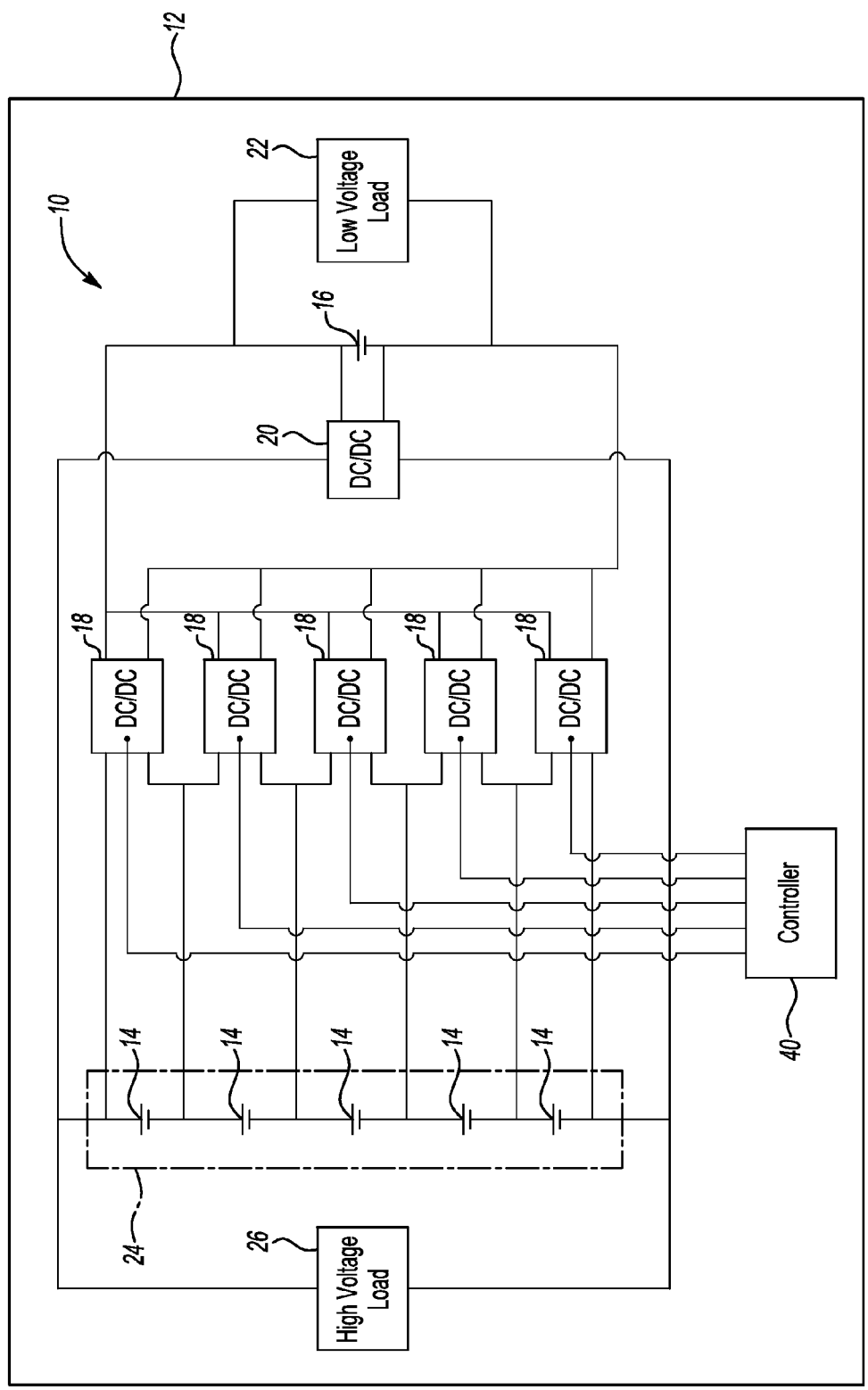
FIG. 1 is a block diagram of an automotive vehicle power system according to an embodiment of the invention.

Referring now to FIG. 1, an electrical power system 10 for an automotive vehicle 12 may include a plurality of high-voltage, e.g., 300 V, storage cells 14, at least one low-voltage, e.g., 12 V, storage cell 16, a plurality of bi-directional DC/DC power converters 18 and a uni-directional DC/DC power converter 20 (having a turn ratio of, for example, 300:12). In the embodiment of FIG. 1, the storage cells 14 are Lithium-Ion batteries and the storage cell 16 is a lead-acid battery. Other storage cells, however, may be used.

The low-voltage storage cell 16 is electrically connected with a low-voltage load 22, such as an ignition system. As apparent to those of ordinary skill, electrical power from the storage cell 16 may be supplied to the load 22 as necessary.

The plurality of storage cells 14 are electrically connected in series and form a high-voltage battery pack 24. The battery pack 24 is electrically connected with the uni-directional DC/DC converter 20 and a high-voltage load 26. The DC/DC converter 20 is also electrically connected with the low-voltage storage cell 16. Electrical power from the battery pack 24 may be supplied to the DC/DC converter 20. The DC/DC converter 20 may step down this high-voltage power to low-voltage power. This low-voltage power may be supplied to the storage cell 16 to, for example, charge the storage cell 16. As apparent to those of ordinary skill, electrical power from the battery pack 24 may also be supplied to the high-voltage load 26, such as an electric machine. The electric machine may be used to provide motive power for the vehicle 12.

Each of the plurality of bi-directional DC/DC power converters 18 are electrically connected with one of the plurality of high-voltage storage cells 14 and the low-voltage storage cell 16. As discussed in more detail below, each of the power converters 18 may pass electrical power between one of the high-voltage storage cells 14/the high-voltage battery pack 24 and the low-voltage storage cell 16.

Figure 2:
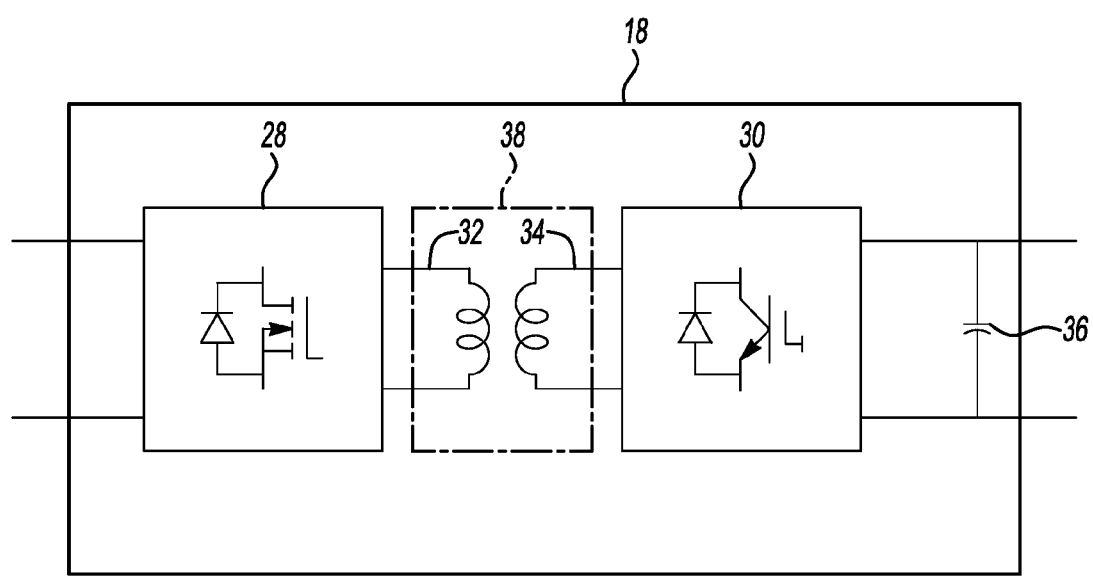
FIG. 2 is a schematic diagram of a DC/DC converter of FIG. 1.

Referring now to FIG. 2, each of the bi-directional DC/DC power converters 18 may include a pair of bi-directional rectifiers/inverters 28, 30, a pair of coils 32, 34 and a capacitor 36. The capacitor 36 may smooth the input/output of electrical current from/to the power converter 18.

In the embodiment of FIG. 2, the bi-directional rectifier/inverter 28 comprises a MOSFET bridge, e.g., a 4-transistor controlled bridge, and is electrically connected with the coil 32. The bi-directional rectifier/inverter 30 also comprises a MOSFET bridge and is electrically connected with the coil 34. Any suitable transistor, however, (such as an IGBT) may be used.

The coils 32, 34 of FIG. 1 have a 3.6:12 turn ratio and form a high frequency isolation transformer 38. The turn ratio may be determined by the nominal voltages of the cells 14, 16: the high-voltage storage cells 14 may each have a nominal voltage of 3.6 V and the low-voltage storage cell 16 may have a nominal voltage of 12 V. As apparent to those of ordinary skill, the isolation transformer 38 electrically isolates the high-voltage battery back 24 from the low-voltage storage cell 16. Of course, the power converters 18 may have any suitable configuration.

Referring again to FIG. 1, the electrical power system 10 further includes a controller 40. The controller 40 is in communication and/or electrically connected with each of the plurality of high-voltage storage cells 14 and each of the bi-directional DC/DC power converters 18.

The controller 40 may determine information related to a condition of each of the storage cells 14. For example, the controller 40 may read temperature, voltage and current information associated with each of the storage cells 14 from appropriate sensors (not shown) operatively arranged to sense such parameters of the storage cells 14. The controller 40 may further determine a state-of-charge of each of the storage cells 14 based on the condition of each of the storage cells 14. The controller 40 may use this information to balance the storage cells 14 of the battery pack 24.

As known in the art, the plurality of storage cells 14 may achieve differing states-of-charge as power is delivered to/removed from the high-voltage battery pack 24. The bi-directional DC/DC power converters 18 may be used to shuttle power between the storage cells 14 to balance the respective states-of-charge. For example, if one or more of the storage cells 14 has a state-of-charge greater than a target state-of-charge, the controller 40 may command those power converters 18 associated with the one or more storage cells 14 to discharge power to, for example, the low-voltage storage cell 16, which, in this example, acts as a reservoir. This power may then be re-distributed to the storage cells 14 of the battery pack 24 or may be retained by the storage cell 16. If one or more of the storage cells 14 has a state-of-charge less than the target state-of-charge, the controller 40 may command those power converters 18 associated with the one or more storage cells to pull power from, for example, the low-voltage storage cell 16 and provide it to the one or more storage cells 14. Other scenarios are, of course, also possible.

Figure 3:
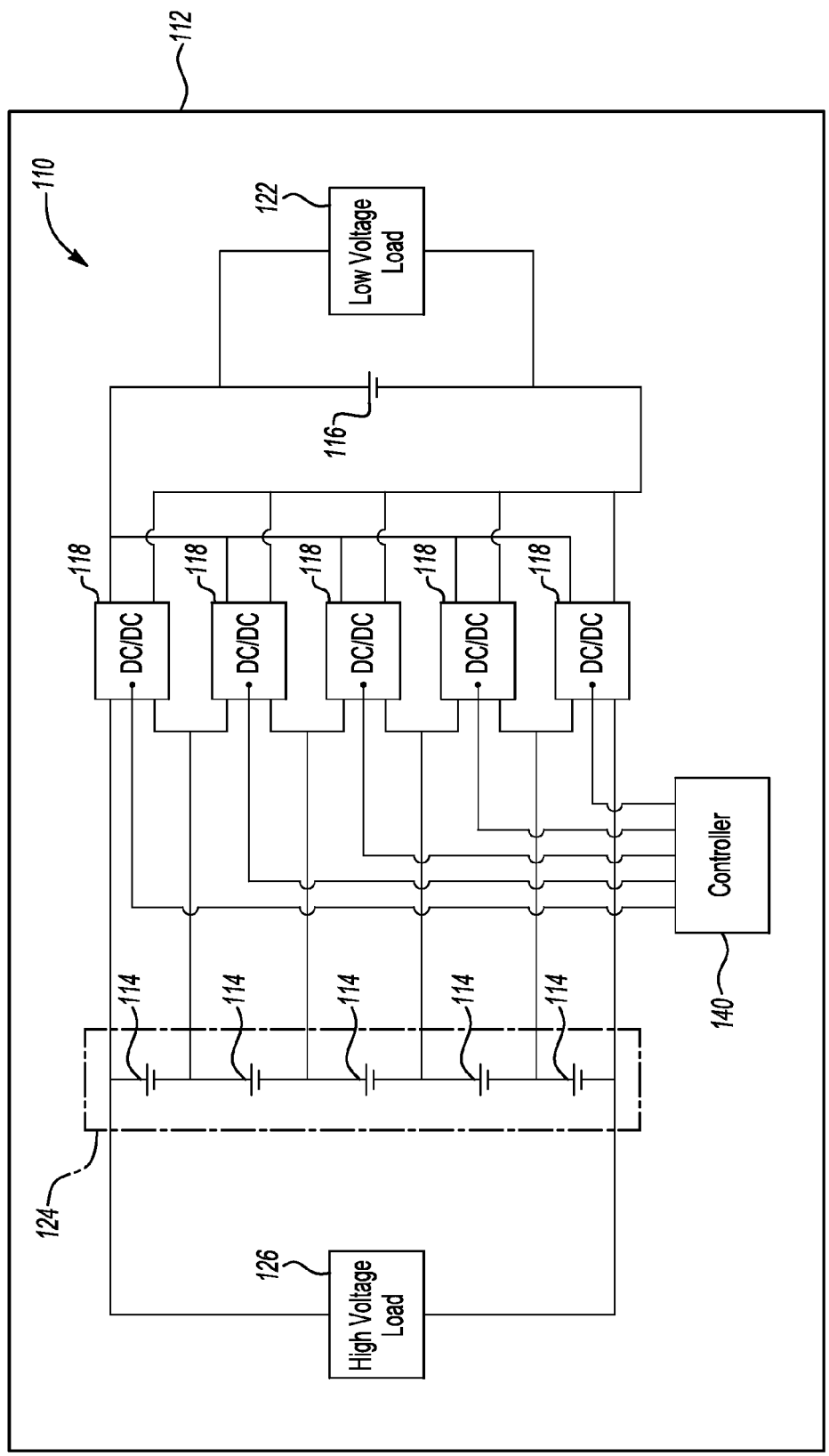
FIG. 3 is a block diagram of an automotive vehicle power system according to another embodiment of the invention.

Referring now to FIG. 3, numbered elements of FIG. 3 that differ by 100 relative to the numbered elements of FIG. 1 have similar, although not necessarily identical, descriptions to the numbered elements of FIG. 1. An electrical power system 110 for an automotive vehicle 112 includes a plurality of high-voltage storage cells 114, at least one low-voltage storage cell 116 and a plurality of bi-directional DC/DC power converters 118. Other configurations, however, are also possible.

The low-voltage storage cell 116 is electrically connected with a low-voltage load 122.

The plurality of storage cells 114 are electrically connected in series and form a high-voltage battery pack 124. The battery pack 124 is electrically connected with a high-voltage load 126. Electrical power from the battery pack 124 may be supplied to the high-voltage load 126.

Each of the plurality of bi-directional DC/DC power converters 118 are electrically connected with one of the plurality of high-voltage storage cells 114 and the low-voltage storage cell 116. Each of the power converters 118 may pass electrical power between one of the high-voltage storage cells 114/the high-voltage battery pack 124 and the low-voltage storage cell 116. As discussed in more detail below, this may be performed to rebalance the storage cells 114 and/or charge the storage cell 116.

The electrical power system 110 further includes a controller 140. The controller 140 is in communication and/or electrically connected with each of the plurality of high-voltage storage cells 114 and each of the bi-directional DC/DC power converters 118. As discussed with reference to the controller 40 illustrated in FIG. 1, the controller 140 may further determine a state-of-charge of each of the storage cells 114 based on their condition. The controller 140 may use this information to balance the storage cells 114 of the battery pack 124 by, for example, commanding selected power converters 118 to shuttle power between the storage cells 114 to achieve balance in a manner similar to that described above.

The controller 140 may also balance the storage cells 114, on the fly, while, for example, providing power to the low-voltage storage cell 116. The controller 140 may, for example, command each of the storage cells 114 to provide a specified amount of power to the storage cell 116. This specified amount may depend on the state-of-charge of the particular storage cell 114. For example, while the converters 118 are commanded by the controller 140 to deliver 1.0 A to support a load on the low voltage storage cell 116, those storage cells 114 having a state-of-charge greater than a target value may have their command adjusted to provide 1.1 A of current for a fixed period of time, while those storage cells 114 having a state-of-charge less than the target value may have their command adjusted to provide 0.9 A of current for the fixed period of time. The fixed period of time may be some portion of the total time current is to be provided to the storage cell 116 to achieve state-of-charge balancing. The controller 140 may thus assess and alter the balance between the storage cells 114 continuously while charging or maintaining the charge on the storage cell 116.

In other embodiments, the low-voltage storage cell 116 may be omitted and the bi-directional DC/DC power converters 118 may be electrically connected with the low-voltage load 122. The power converters 118 may be sized to handle maximum transient loads presented by the load 122 and thus power from the storage cells 114 may be stepped up and collectively provided to the load 122 via the power converters 118. Other arrangements and configurations are also possible.

While example embodiments in accordance with the invention are illustrated and disclosed, such disclosure should not be construed to limit the invention. It is anticipated that various modifications and alternative designs may be made without departing from the scope of the invention.

What is claimed:

1. An energy storage system for an automotive vehicle comprising:
   a plurality of energy storage units electrically connected in series;
   a plurality of bi-directional energy converters each having first and second sides, each of the first sides electrically connected with a respective one of the energy storage units such that each of the bi-directional energy converters accesses only one of the energy storage units; and
   another energy storage unit, the second sides of the bi-directional energy converters electrically connected in parallel with the another energy storage unit, each of the bi-directional energy converters capable of transferring energy between the first and second sides.

2. The system of claim 1 wherein the first and second sides each have a voltage and wherein the voltages are different.

3. The system of claim 1 wherein the bi-directional energy converters comprise DC/DC converters.

4. The system of claim 1 wherein the plurality of energy storage units comprise lithium ion batteries.

5. The system of claim 1 wherein the another energy storage unit comprises a lead-acid battery.

6. The system of claim 1 further comprising a uni-directional energy converter having an input side and an output side, the input side electrically connected with the plurality of energy storage units and the output side electrically connected with the another energy storage unit, the uni-directional energy converter capable of transferring energy from the input side to the output side.

7. The system of claim 1 wherein the plurality of energy storage units are electrically isolated from the another energy storage unit.

8. The system of claim 7 wherein the plurality of bi-directional energy converters electrically isolate the plurality of energy storage units from the another energy storage unit.

9. The system of claim 1 further comprising a controller in communication with each of the plurality of bi-directional energy converters and configured to receive information about the plurality of energy storage units.

10. The system of claim 9 wherein the information about the plurality of energy storage units includes at least one of temperature information, voltage information and current information.

11. The system of claim 9 wherein the controller is configured to determine a state of charge of each of the plurality of energy storage units based on the received information.

12. The system of claim 1 further comprising a controller configured to command, at the same time, (i) some of the plurality of bi-directional energy converters to transfer energy from the first side to the second side and (ii) other of the plurality of bi-directional energy converts to transfer energy from the second side to the first side.

13. An automotive vehicle comprising:
   an electric machine;
   a plurality of batteries electrically connected in series and electrically connected with the electric machine;
   a plurality of bi-directional DC/DC power converters each having first and second sides, each of the first sides electrically connected with a respective one of the batteries such that each of the bi-directional DC/DC power converters accesses only one of the batteries;
   an electrical load; and
   another battery electrically connected with the electrical load, the second sides of the bi-directional DC/DC power converters electrically connected in parallel with the another battery, each of the bi-directional DC/DC power converters capable of transferring energy between the first and second sides.

14. The vehicle of claim 13 wherein the first and second sides each have a voltage and wherein the voltages are different.

15. The vehicle of claim 13 further comprising a uni-directional DC/DC power converter having an input side and an output side, the input side electrically connected with the plurality of batteries and the output side electrically connected with the another battery, the uni-directional DC/DC power converter capable of transferring energy from the input side to the output side.

16. The vehicle of claim 13 wherein the plurality of bi-directional DC/DC power converters electrically isolate the plurality of batteries from the another battery.

17. The vehicle of claim 13 further comprising a controller in communication with each of the plurality of bi-directional DC/DC power converters and configured to (i) receive information about the plurality of batteries and (ii) determine a state of charge of each of the plurality of batteries based on the received information.

18. The vehicle of claim 17 wherein the controller is further configured to command, at the same time, (i) some of the plurality of bi-directional DC/DC power converters to transfer energy from the first side to the second side and (ii) other of the plurality of bi-directional DC/DC power converts to transfer energy from the second side to the first side.

19. An energy storage system for an automotive vehicle comprising:
   a battery pack including a plurality of energy storage cells;
   a plurality of bi-directional DC/DC power converters each having first and second sides and capable of transferring energy between the first and second sides, each of the first sides electrically connected with a respective one of the energy storage cells such that each of the bi-directional DC/DC power converters accesses only one of the energy storage cells and the second sides electrically connected in parallel; and
   a controller configured to balance the battery pack by passing energy between at least two of the energy storage cells via at least one of the bi-directional DC/DC power converters.

20. The system of claim 19 wherein the controller is in communication with each of the plurality of bi-directional DC/DC power converters and further configured to (i) receive information about the plurality of batteries and (ii) determine a state of charge of each of the plurality of batteries based on the received information.

* * * * *